United States Patent
Mayer et al.

(10) Patent No.: US 11,654,958 B2
(45) Date of Patent: May 23, 2023

(54) DETECTING IMPACT FORCES ON AN ELECTRIC POWER STEERING SYSTEM

(71) Applicant: Robert Bosch GmbH, Stuttgart (DE)

(72) Inventors: Sebastian Mayer, Plymouth, MI (US); Achim Frankovics, Novi, MI (US)

(73) Assignee: Robert Bosch GmbH, Stuttgart (DE)

( * ) Notice: Subject to any disclaimer, the term of this patent is extended or adjusted under 35 U.S.C. 154(b) by 669 days.

(21) Appl. No.: 16/599,941

(22) Filed: Oct. 11, 2019

(65) Prior Publication Data

US 2020/0114952 A1    Apr. 16, 2020

Related U.S. Application Data

(60) Provisional application No. 62/744,751, filed on Oct. 12, 2018.

(51) Int. Cl.
| | |
|---|---|
| *B62D 5/04* | (2006.01) |
| *G01L 5/22* | (2006.01) |
| *G01P 3/46* | (2006.01) |
| *B62D 3/04* | (2006.01) |

(52) U.S. Cl.
CPC ............. *B62D 5/0481* (2013.01); *B62D 3/04* (2013.01); *B62D 5/0424* (2013.01); *B62D 5/0463* (2013.01); *G01P 3/465* (2013.01); *G01L 5/221* (2013.01)

(58) Field of Classification Search
CPC .. B62D 5/0481; B62D 5/0421; B62D 5/0463; B62D 3/04; G01P 3/465; G01P 3/44; G01L 5/20

See application file for complete search history.

(56) References Cited

U.S. PATENT DOCUMENTS

| | | |
|---|---|---|
| 6,257,563 B1 | 7/2001 | Oellers et al. |
| 6,390,230 B1 | 5/2002 | Shimizu et al. |
| 6,543,570 B2 | 4/2003 | Parker |
| 7,284,634 B2 | 10/2007 | Tatewaki et al. |

(Continued)

FOREIGN PATENT DOCUMENTS

| | | |
|---|---|---|
| CN | 1199682 A | 11/1998 |
| CN | 102753421 A | 10/2012 |

(Continued)

OTHER PUBLICATIONS

Translation of Chinese Search Report for Application No. 201910967159.3 dated Nov. 23, 2022 (4 pages).

*Primary Examiner* — Tony H Winner
(74) *Attorney, Agent, or Firm* — Michael Best & Friedrich LLP

(57) ABSTRACT

An electric power steering system. One example includes a steering control, a steering shaft connected to the steering control, a steering rack, a sensor configured to detect an operating parameter of the steering rack or an electric motor, and an electronic controller. In one example, the electronic controller is configured to receive data indicative of the operating parameter from the sensor, compare the data to a known characteristic curve, the known characteristic curve indicating potential damage to a component of the electric power steering system, and when the data matches the known characteristic curve, output an indication to a user that potential damage has occurred to the component of the electric power steering system.

18 Claims, 6 Drawing Sheets

(56) References Cited

U.S. PATENT DOCUMENTS

| | | | |
|---|---|---|---|
| 7,493,984 B2 | 2/2009 | Ono et al. | |
| 8,051,687 B2 | 11/2011 | De Carteret et al. | |
| 9,689,762 B2 | 6/2017 | Takahashi et al. | |
| 9,937,952 B2 | 4/2018 | Schnug et al. | |
| 2006/0131096 A1 | 6/2006 | Ono et al. | |
| 2008/0017439 A1* | 1/2008 | Sawada | B62D 5/0484 180/446 |
| 2008/0243329 A1 | 10/2008 | Hamel et al. | |
| 2009/0120714 A1* | 5/2009 | Hisanaga | B62D 5/0466 180/446 |
| 2009/0150018 A1 | 6/2009 | Brown et al. | |
| 2010/0126795 A1 | 5/2010 | Tokunaga | |
| 2011/0024224 A1 | 2/2011 | Mori et al. | |
| 2013/0179037 A1 | 7/2013 | Ebihara et al. | |
| 2016/0167701 A1 | 6/2016 | Sone et al. | |
| 2016/0347360 A1 | 12/2016 | Schnug et al. | |
| 2017/0305458 A1 | 10/2017 | Wang et al. | |
| 2018/0127021 A1* | 5/2018 | Wang | B62D 6/10 |
| 2018/0237056 A1 | 10/2018 | Bremkens et al. | |
| 2019/0023313 A1* | 1/2019 | Zuzelski | B62D 5/0481 |
| 2019/0355187 A1* | 11/2019 | Frankovics | B62D 5/0481 |
| 2021/0245803 A1* | 8/2021 | Mayer | B62D 3/126 |

FOREIGN PATENT DOCUMENTS

| | | |
|---|---|---|
| CN | 108367776 A | 8/2018 |
| CN | 108569334 A | 9/2018 |
| WO | 2017102375 A1 | 6/2017 |

\* cited by examiner

DETECTING IMPACT FORCES ON AN ELECTRIC POWER STEERING SYSTEM

CROSS REFERENCE TO RELATED APPLICATIONS

This application claims priority to U.S. Provisional Patent Application No. 62/744,751, filed Oct. 12, 2018, the content of which is incorporated by reference in its entirety.

BACKGROUND

In electric power steering ("EPS") systems, an electric motor drives a gear to provide extra torque to a steering rack to assist in turning wheels of a vehicle. In general, EPS systems include many mechanically and electrically connected components. These components may be damaged should the vehicle collide with external objects (for example, curbs, potholes, other vehicles). Often, a user of the vehicle may not be aware that an EPS system is damaged after a collision with an external object.

SUMMARY

Therefore, a system is needed to detect potential damage to components of the EPS system based upon operating parameters of the components. For example, as explained in more detail below, components may suffer impact forces from external objects. These forces can be detected by sensors and compared to known characteristics of forces that can cause damage to components of the EPS system. By detecting these forces and comparing them to the characteristics, the system can determine if components may be damaged.

Embodiments described herein therefore relate to an electric power steering system.

One embodiment provides an electric power steering system. In one example, the system includes a steering control, a steering shaft connected to the steering control, a steering rack, a sensor configured to detect an operating parameter of the steering rack or the electric motor, and an electronic controller configured to receive data indicative of the operating parameter from the sensor, and compare the data to a known characteristic curve. In one example, the known characteristic curve indicates potential damage to a component of the electric power steering system. The electronic controller is also configured to output an indication to a user that potential damage has occurred to the component of the electric power steering system, when the data matches the known characteristic curve.

Another embodiment provides a method for detecting potential damage to an electric power steering system, the system comprising a steering control, a steering shaft connected to the steering control, a steering rack, an electric motor configured to provide an extra torque to the steering rack, a sensor configured to detect an operating parameter of the steering rack or the electric motor, and an electronic controller. The method includes receiving, with the electronic controller, data indicative of the operating parameter from the sensor and comparing, with the electronic controller, the data to a known characteristic curve, the known characteristic curve indicating potential damage to a component of the electric power steering system. When the data matches the known characteristic curve, the electronic controller outputs an indication to a user that potential damage has occurred to the component of the electric power steering system.

Other aspects, features, and embodiments will become apparent by consideration of the detailed description and accompanying drawings.

DETAILED DESCRIPTION

Before any embodiments are explained in detail, it is to be understood that this disclosure is not intended to be limited in its application to the details of construction and the arrangement of components set forth in the following description or illustrated in the following drawings. Embodiments are capable of other configurations and of being practiced or of being carried out in various ways.

A plurality of hardware and software based devices, as well as a plurality of different structural components may be used to implement various embodiments. In addition, embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (for example, stored on non-transitory computer-readable media) executable by one or more electronic controllers. For example, "control units" and "controllers" described in the specification can include one or more electronic controllers, electronic processors, or similar devices, one or more memories including non-transitory computer-readable media, one or more input/output interfaces, one or more application specific integrated circuits (ASICs) and other circuits, and various connections (for example, wires, printed traces, and busses) connecting the various components.

Figure 1:
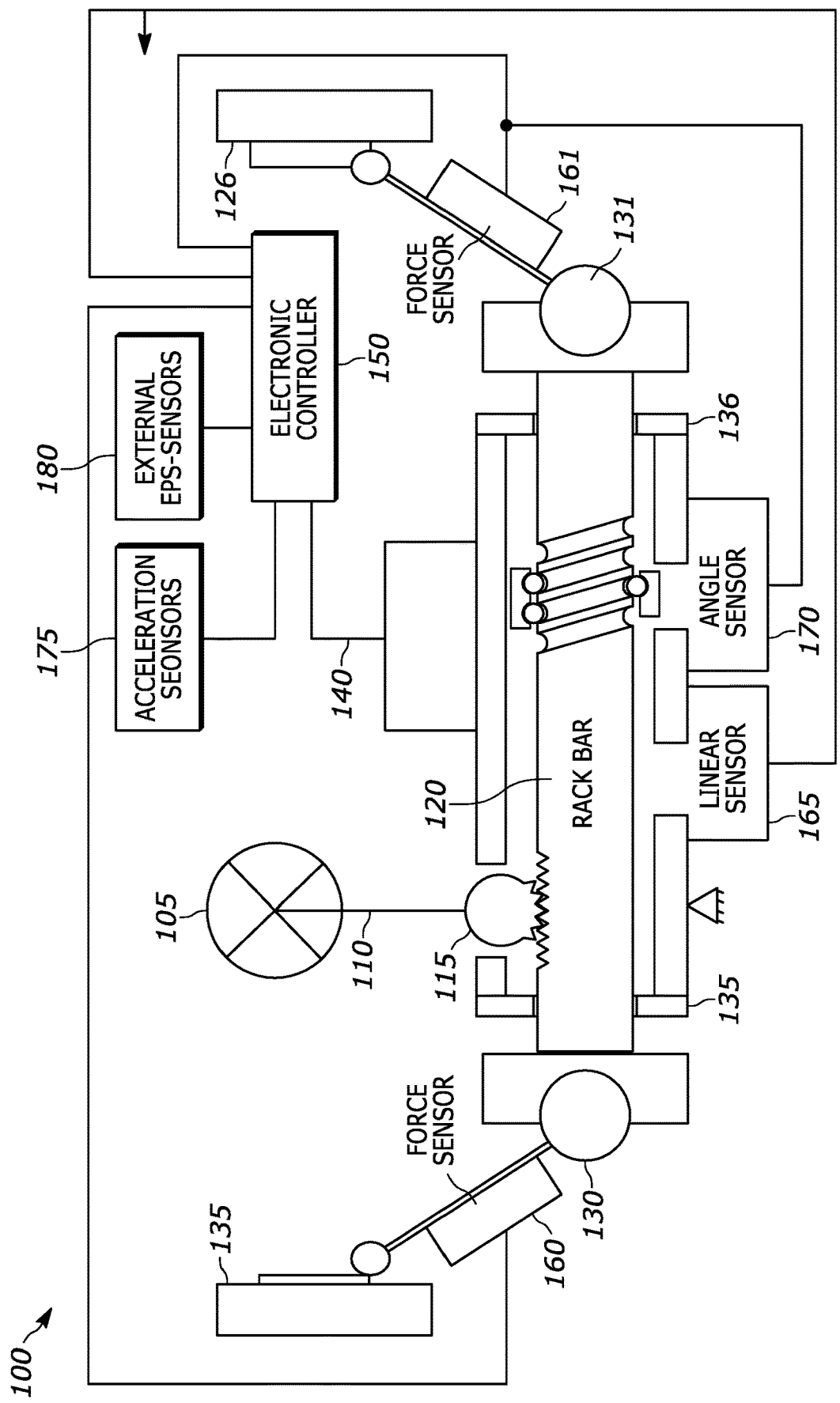
FIG. 1 illustrates an electric power steering system according to one embodiment.

FIG. 1 illustrates an electric power steering ("EPS") system 100 of a vehicle according to one embodiment. The EPS system 100 includes a steering control 105 (for example, a steering wheel) connected via a steering shaft 110 to a steering pinion 115. However, in embodiments where the vehicle includes a "steer by wire" system, the steering shaft 110 may not be present. Instead, a sensor detects an amount of requested steering from the steering control 105 and, based upon the detected amount of requested steering, a controller operates the pinion 115 as described below.

The steering pinion 115 may be, for example, a steering gear. When a user operates the steering control 105, the steering pinion 115 turns and moves a steering rack 120 in a desired steering direction. The movement of the steering rack 120 then turns wheels 125 and 126 to turn the vehicle in the desired steering direction. In some embodiments, the wheels 125 and 126 are front wheels of the vehicle; in other embodiments, the wheels 125 and 126 are rear wheels of the vehicle.

The wheels 125 and 126 are connected to the steering rack 120 via ball joints 130 and 131. When the steering rack 120 is moved by the steering pinion 115, the ball joints 130 and 131 move the wheels 126 and 126 (for example, turning the wheels in the desired steering direction). As the steering rack 120 approaches a maximum steering rack travel distance (for example, how far left or right the steering rack 120 can be moved by the steering pinion 115), the ball joints 130 and 131 impact dampers 135 and 136, respectively. The dampers 135 and 136 are provided at either end of the steering rack 120 to prevent damage to the steering rack 120 in the event the ball joints 130 and 131 turn the wheels 125 and 126 too far or if outside forces are applied via the ball joints 130 and 131 to the steering rack 120, as illustrated in further detail below.

Figure 2:
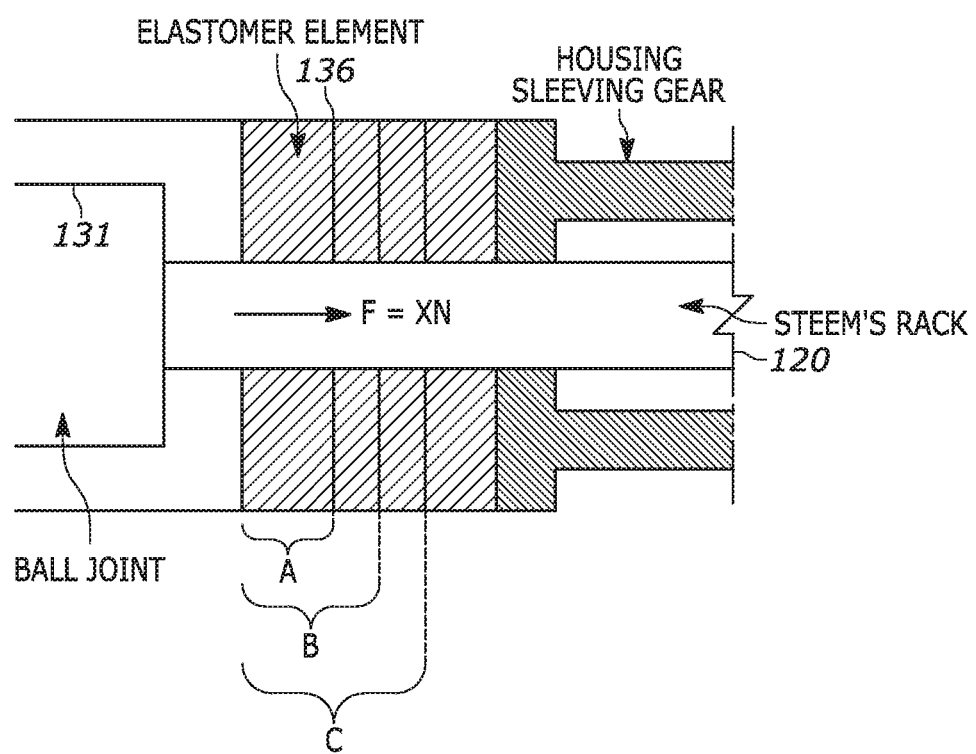
FIG. 2 illustrates an elastomer damper according to one embodiment.

The dampers 135 and 136 may be made of different kinds of materials. In one embodiment, the dampers 135 and 136 may be made of elastomer. Elastomeric dampers can be compressed as more force is applied by the ball joints 130 and 131 to the steering rack 120. For example, FIG. 2 illustrates different levels of compression for an elastomer damper.

As force is applied from the ball joints 130 and 131 to the steering rack 120, the dampers 135 and 136 compress. For example, the dampers 135 and 136 compress as the steering rack 120 approaches the maximum steering rack travel distance. As the force increases (for example, based upon a user input torque from the steering control 105 and electric power steering assistance from an electric motor as described below) the dampers 135 and 136 compress further to a first point or level illustrated as "A". The amount the dampers 135 and 136 compress can be determined based upon a current steering rack 120 position, a known damper stiffness, a known damper position, and a sensed force being applied to the steering rack 120.

As the dampers 135 and 136 wear or suffer non-critical force events (for example, the wheels 125 and 126 striking a pothole or softly impacting an object, for example, a curb, while the steering rack 120 is not approaching the maximum steering rack travel distance), the dampers 135 and 136 may compress to a second point or level illustrated as "B". B is considered to be a non-critical compression because the EPS system 100 is not in danger of being damaged by the force necessary to generate the compression of the dampers 135 and 136 to B.

If the dampers 135 and 136 suffer critically-high rack forces (for example, forces high enough to damage the steering rack 120 or other components of the EPS system 100), the dampers 135 and 136 compress to a third point or level illustrated as "C." For example, if the wheels 125 and 126 strike a curb while the steering rack 120 is at the maximum steering rack travel distance, the forces experienced compresses the dampers 135 and 136 compress to C and the steering rack 120 or other components of the EPS system 100 (in particular, the steering pinion 115) may be damaged by the forces.

In another embodiment, the dampers 135 and 136 are made of plastic. When the plastic dampers 135 and 136 experience critically-high rack forces (for example, forces high enough to compress elastomer dampers 135 and 136 to C as shown in FIG. 2), the plastic dampers 135 and 136 are designed to be destroyed. A higher steering angle (for example, the angle the wheels 125 and 126 can be turned) is possible once the dampers 135 and 136 are destroyed. Therefore, a user of the vehicle may notice that the wheels 125 and 126 turn more, which indicates damage to the EPS system 100. In some embodiments, each of the wheels 125 and 126 has a sensor that determines how far each of the wheels 125 and 126 turns, and then communicates the angle of the turn to an electronic controller (as discussed below). The angle of the turn may be compared to a threshold angle value. When the angle is greater than the threshold angle value, the electronic controller indicates to the user that the plastic dampers 135 and 136 have been destroyed.

Returning to FIG. 1, the EPS system 100 also includes an electric motor 140. The electric motor 140 is used to provide an extra torque to move the steering rack 120 (in addition to torque from the steering pinion 115) to assist in turning the wheels 125 and 126. The amount of extra torque applied by the electric motor 140 is determined based upon a user input (for example, an amount a user turns the steering control 105).

Figure 3:
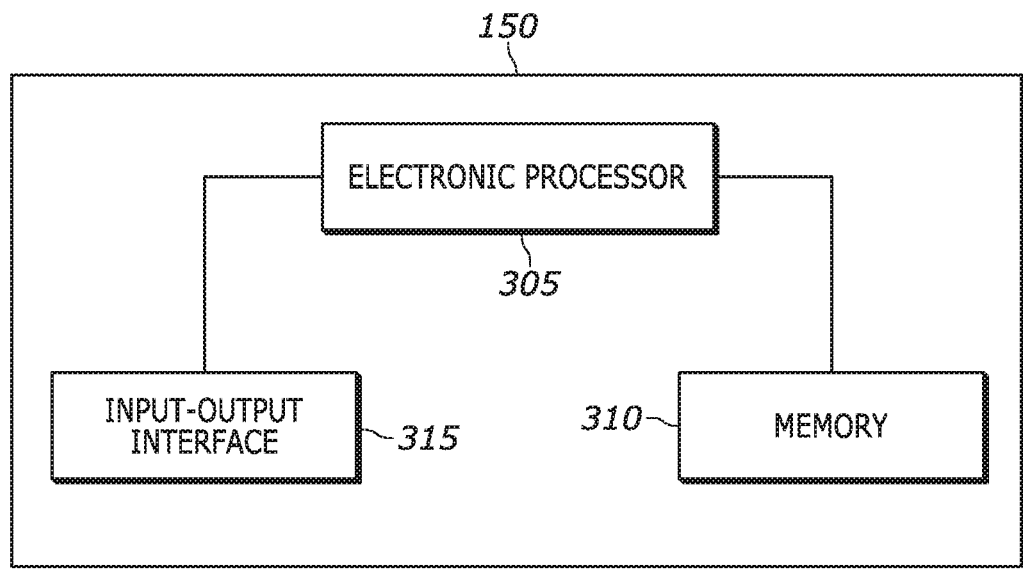
FIG. 3 illustrates an electronic controller according to one embodiment.

The EPS system 100 also includes an electronic controller 150. FIG. 3 is an illustrative example of the electronic controller 150. The electronic controller 150 includes a plurality of electrical and electronic components that provide power, operation control, and protection to the components and modules within the electronic controller 150. In the example illustrated, the electronic controller 150 includes an electronic processor 305 (for example, a programmable electronic microprocessor, microcontroller, or similar device), a memory 310 (for example, non-transitory, machine-readable memory), and an input-output interface 315. The electronic processor 305 is communicatively connected to the memory 310 and the input-output interface 315. The electronic processor 305, in coordination with software stored in the memory 310 and the input-output interface 315, is configured to implement, among other things, the methods described herein.

The electronic controller 150, in some embodiments, may be implemented in several independent controllers (for example, programmable electronic control units) each configured to perform specific functions or sub-functions. Additionally, the electronic controller 150 may contain sub-modules that include additional electronic processors, memory, or application-specific integrated circuits (ASICs) for handling input-output functions, processing of signals, and application of the methods listed below. In other embodiments, the electronic controller 150 includes additional, fewer, or different components.

Returning again to FIG. 1, the electronic controller 150 is electrically connected to a plurality of sensors. In one example, the electronic controller 150 is connected to force sensors 160 and 161, a linear sensor 165, an angle sensor 170, an acceleration sensor 175, and other external EPS sensors 180.

The force sensors 160 and 161 determine a force imparted on the ball joints 130 and 131 (for example, by the wheels 125 and 126 impacting an object). The linear sensor 165 determines a direction and amount of movement of the steering rack 120 as the steering pinion 115 (and the electric motor 140) moves the steering rack 120 in response to a user turning the steering control 105. The angle sensor 170 detects an angular velocity of the electric motor 140 as the electric motor 140 provides the extra torque to the steering rack 120. In some embodiments, the angle sensor 170 instead detects an angular velocity of the pinion 115.

The acceleration sensor 175 may be one or more sensors measuring different accelerations of the EPS system 100.

For example, the acceleration sensor 175 may measure the acceleration of the rotation of the steering shaft 110, the acceleration of the steering rack 120 as it is moved (by the steering pinion 115 or by external forces), and the like. The external EPS sensors 180 are various other sensors associated with the EPS system 100. For example, the external EPS sensors 180 may include a temperature sensor, a current sensor, a voltage sensor, and the like.

Figure 4:
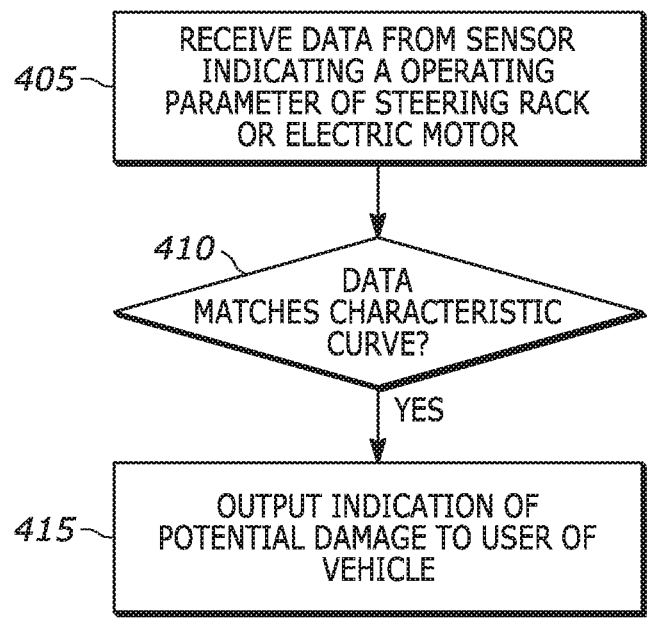
FIG. 4 is a flowchart illustrating a method for determining potential damage to an electric power steering system according to one embodiment.

FIG. 4 is a flowchart illustrating a method 400 for determining potential damage to the EPS system 100 according to one embodiment.

The method 400 includes receiving, with the electronic controller 150, data from at least one sensor (at block 405). For example, the electronic controller 150 receives data indicating a force on the steering rack 120 from one of the force sensors 160 and 161 when force is applied by an external object on the wheels 125 and 126 (and therefore force applied on the ball joints 130 and 131). In another example, the electronic controller 150 receives data indicating an amount of lateral displacement of the steering rack 120 and/or a lateral velocity from the linear sensor 165 (for example, a displacement in either a left or right direction and/or a velocity in either direction). In yet another example, the electronic controller receives data indicating an angular velocity (and/or revolutions per minute) of the electric motor 140 as the electric motor 140 provides an extra torque to laterally displace the steering rack 120. The data received by the electronic controller 150 is, in general, an operating parameter of at least one of the steering rack 120 (for example, the lateral displacement of the steering rack 120 or the force applied on the steering rack 120) or the electric motor 140 (for example, the angular velocity of the electric motor 140).

The method 400, in some embodiments, also includes determining, with the electronic controller 150, a derived value from the received data. For example, in some embodiments the electronic controller is configure to determine a measured angle gradient based upon the received angular velocity when the electronic controller 150 receives an angular velocity from the angle sensor 170. In another example, the electronic controller 150 is further configured to determine a speed gradient of the steering rack 120 as it is laterally displaced when the electronic controller 150 receives an amount of lateral displacement of the steering rack 120 from the linear sensor 165. The electronic controller 150 may also be configured to determine a speed gradient based upon a lateral velocity of the steering rack 120 received from the linear sensor 165.

In one example, the method 400 also includes determining, with the electronic controller 150, whether the received data matches a known characteristic curve indicating potential damage to a component of the EPS system 100 (at block 410). The known characteristic curves are saved, in some embodiments, in the memory 310.

Figure 5:
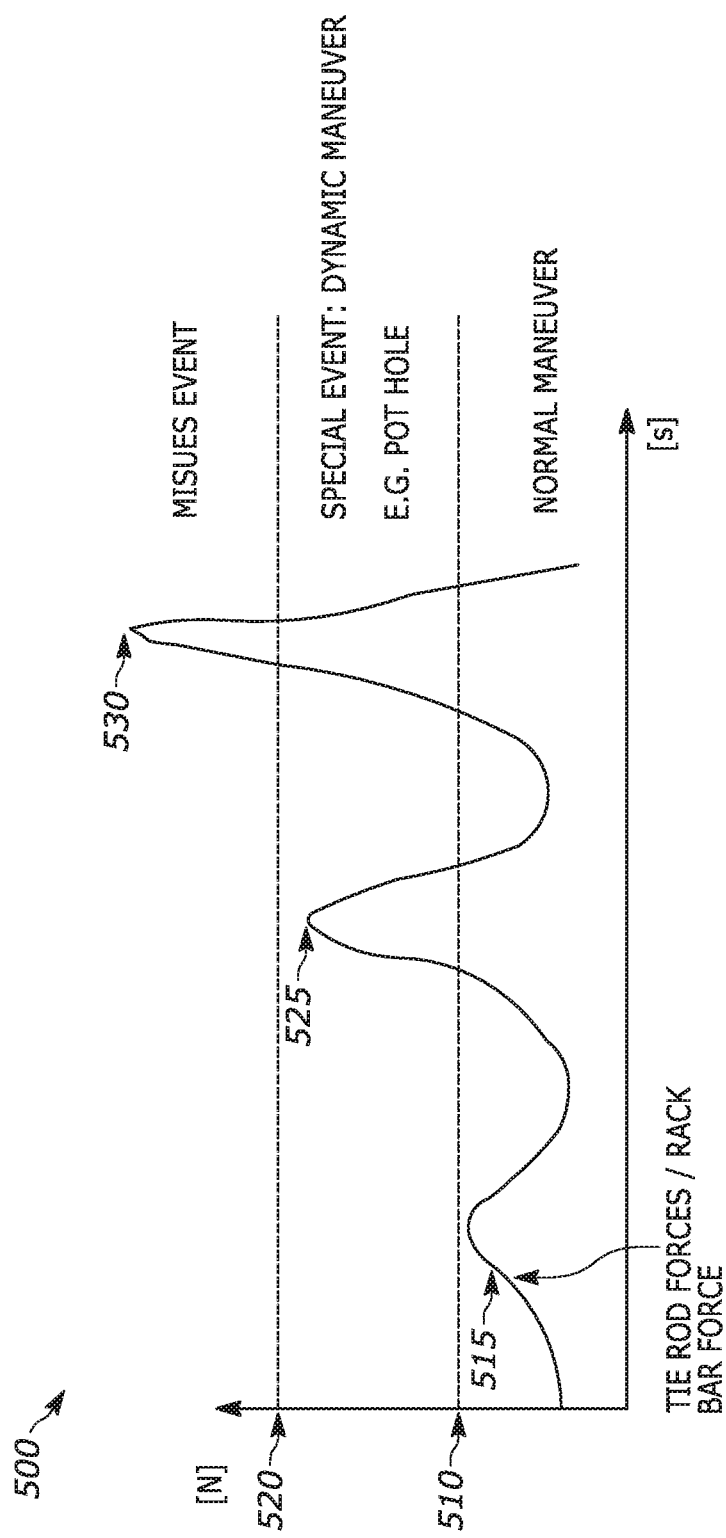
FIG. 5 illustrates a force characteristic curve according to one embodiment.

For example, FIG. 5 illustrates a known force characteristic curve 500.

In the example shown in FIG. 5, the force applied to the steering rack 120 over time, as measured by the force sensors 160 and 161, may be compared to the known force characteristic curve 500 to determine a type of event that has occurred. For example, if the received is less than a first threshold 510 and only gradually increases and decreases over time (for example, at first inflection point 515), the electronic controller 150 determines that the vehicle underwent a normal maneuver, for example, a user of the vehicle turning the vehicle in a particular direction. If the force measured is between the first threshold 510 and a second threshold 520 and increases and decreases more rapidly than a normal maneuver (for example, at second inflection point 525), the electronic controller 150 determines that the vehicle has underwent a more dynamic maneuver (for example, the vehicle has hit a pothole or has made a sharper turn).

If the force measured is above the second threshold 520 and increases and decreases more rapidly than the dynamic maneuver (for example, at third inflection point 530), the electronic controller 150 determines that the forces applied to the steering rack 120 may have caused potential damage to one or more components of the EPS system 100. For example, the forces experienced at the third inflection point 530 may have damaged the steering pinion 115, the ball joints 130 and 131, the dampers 135 and 136, the steering rack 120, or other components of the EPS system 100.

Figure 6:
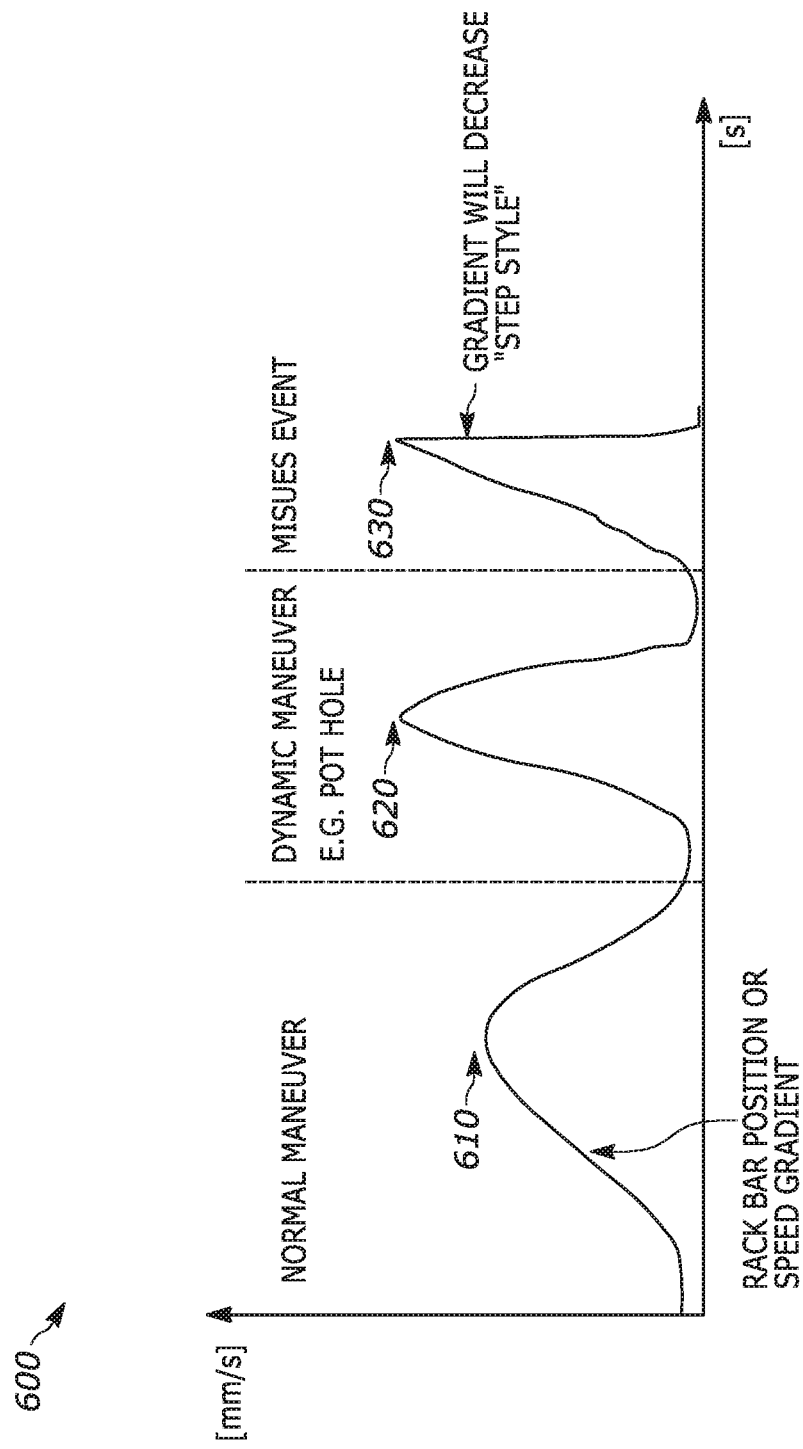
FIG. 6 illustrates a position characteristic curve according to one embodiment.

In another example, if the electronic controller 150 receives lateral displacement data from the linear sensor 165, the electronic controller 150 compares the data to a known position characteristic curve 600 (as illustrated in FIG. 6).

The steering rack 120 must be moved laterally by the steering pinion 115 in order to turn the vehicle. The linear sensor 165 detects and measures the lateral displacement and lateral velocity of the steering rack 120 as it is moved (by the steering pinion 115 or another external force, for example, impacting a curb).

For example, during a normal turning maneuver (at first inflection point 610), the linear velocity (or displacement) increases gradually and then decreases back towards zero. Much like the forces exerted on the steering rack 120 during a dynamic maneuver (for example, impacting a pothole), the linear velocity (or displacement) of the steering rack 120 increases and decreases much more rapidly and has a higher amplitude than a normal maneuver (for example, at second inflection point 620).

If the linear velocity or displacement of the steering rack 120 increases and decreases even more rapidly than a dynamic maneuver with a larger amplitude (for example, at third inflection point 630), the electronic controller 150 may determine that one or more components of the EPS system 100 has suffered potential damage. Furthermore, the linear velocity or position may decrease stepwise as the vehicle comes out of contact with an impacting object.

Figure 7:
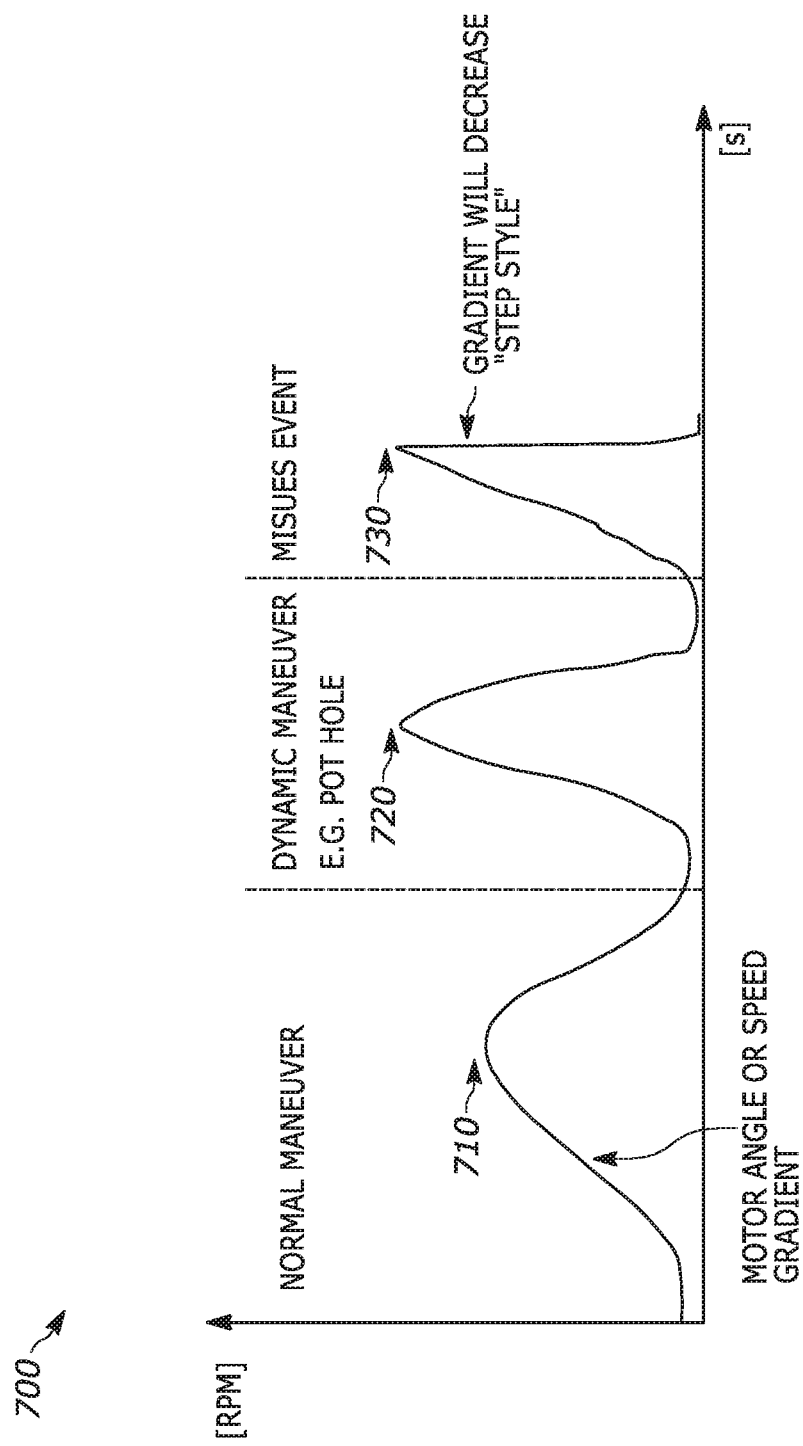
FIG. 7 illustrates an angular velocity characteristic curve according to one embodiment.

In yet another example, the electronic controller 150 may compare a received angular velocity (in radians per second or revolutions per minute) to a known angular velocity characteristic curve 700 (as illustrated in FIG. 7).

The angle sensor 170 monitors the angular velocity of the electric motor 140 as it assists in providing an extra torque to the steering rack 120. Much like the linear displacement of the steering rack 120 during a normal maneuver, the electric motor 140 (at first inflection point 710) provides a gradual increase and decrease in extra torque, which is reflected in increasing or decreasing revolutions per minute (RPMs). During a dynamic maneuver (for example, impacting a pot hole), the RPMs may increase to a larger amplitude than a normal maneuver in order to compensate for the extra forces introduced and may increase and decrease more rapidly (for example, at second inflection point 720).

If the EPS system 100 has suffered potential damage, the angular velocity amplitude will be much higher and will increase and decrease much more rapidly (for example, at third inflection point 730). Much like the position characteristic curve, a curve indicating potential damage received from the angle sensor 170 will also decrease stepwise.

It is to be understood that the electronic controller 150 may receive data from more than one sensor and compare each set of received data to its respective characteristic curve in order to determine if potential damage has been done to one or more components of the EPS system 100. For example, the electronic controller 150 may receive any combination of force data, linear displacement data, and angular velocity data from the respective sensors and compare each to its respective characteristic curve.

After determining that the received data matches a known curve, the electronic controller 150 outputs an indication to a user of the vehicle that potential damage has occurred (at block 415). For example, the electronic controller 150 may be electrically connected to a notification indicator, for example, a display screen, light-emitting diode (LED), a speaker, or some other form of indicator. The electronic controller 150 generates a notification, for example, a visual or text message or a spoken message, indicating the potential damage to the EPS system 100 and outputs it to the user.

The following examples illustrate example systems and methods described herein.

Example 1: an electric power steering system, the system comprising a steering control; a steering shaft connected to the steering control; a steering rack; an electric motor configured to provide an extra torque to the steering rack; a sensor configured to detect an operating parameter of the steering rack or the electric motor; and an electronic controller configured to receive data indicative of the operating parameter from the sensor; compare the data to a known characteristic curve, the known characteristic curve indicating potential damage to a component of the electric power steering system; and, when the data matches the known characteristic curve, output an indication to a user that potential damage has occurred to the component of the electric power steering system.

Example 2: the system of example 1, wherein the sensor is configured to detect a force applied to the steering rack.

Example 3: the system of example 2, wherein the steering rack includes two dampers attached to either end of the steering rack, and wherein the detected force is a force imparted on at least one of the two dampers.

Example 4: the system of example 1, wherein the sensor is configured to detect a lateral displacement of the steering rack.

Example 5: the system of example 4, wherein the electronic controller is further configured to determine a speed gradient of the steering rack based upon the lateral displacement.

Example 6: the system of example 1, wherein the sensor is configured to detect an angular velocity of the electric motor.

Example 7: the system of example 6, wherein the electronic controller is further configured to determine a measured angle gradient based upon the angular velocity.

Example 8: the system of any of examples 1-7, wherein the comparison of the data to the known characteristic curve includes comparing the data to a threshold.

Example 9: the system of any of examples 1-8, wherein the sensor is one of a plurality of sensors configured to detect an operating parameter of the steering rack or the electric motor.

Example 10: the system of any of examples 1-8 and example 9, wherein the electronic controller is configured to compare data from each of the plurality of sensors to a known respective characteristic curve in order to determine if damage has occurred to the steering rack or electric motor.

Example 11: a method for detecting potential damage to an electric power steering system, the system comprising a steering control, a steering shaft connected to the steering control, a steering rack, an electric motor configured to provide an extra torque to the steering rack, a sensor configured to detect an operating parameter of the steering rack or the electric motor, and an electronic controller, the method comprising receiving, with the electronic controller, data indicative of the operating parameter from the sensor; comparing, with the electronic controller, the data to a known characteristic curve, the known characteristic curve indicating potential damage to a component of the electric power steering system; and, when the data matches the known characteristic curve, outputting, with the electronic controller, an indication to a user that potential damage has occurred to the component of the electric power steering system.

Example 12: the method of example 11, wherein the sensor is configured to detect a force applied to the steering rack.

Example 13: the method of example 12, wherein the steering rack includes two dampers attached to either end of the steering rack, and wherein the detected force is a force imparted on at least one of the two dampers.

Example 14: the method of example 11, wherein the sensor is configured to detect a lateral displacement of the steering rack.

Example 15: the method of example 14, further comprising determining, with the electronic controller, a speed gradient of the steering rack based upon the lateral displacement.

Example 16: the method of example 11, wherein the sensor is configured to detect an angular velocity of the electric motor.

Example 17: the method of example 16, further comprising determining, with the electronic controller, a measured angle gradient based upon the angular velocity.

Example 18: the method of any of examples 11-17, wherein the comparison of the data to the known characteristic curve includes comparing the data to a threshold.

Example 19: the method of any examples 11-18, wherein the sensor is one of a plurality of sensors configured to detect an operating parameter of the steering rack or the electric motor.

Example 20: the method of any of examples 11-18 and 19, further comprising comparing, with the electronic controller, data from each of the plurality of sensors to a known respective characteristic curve in order to determine if damage has occurred to the steering rack or electric motor.

Thus, embodiments described herein describe an electric power steering system.

Various features, advantages, and embodiments are set forth in the following claims.

What is claimed is:

1. An electric power steering system, the system comprising:
    a steering control;
    a steering shaft connected to the steering control;
    a steering rack;
    an electric motor configured to provide an extra torque to the steering rack;
    a sensor configured to detect an operating parameter of the steering rack or the electric motor; and
    an electronic controller configured to
        receive data indicative of the operating parameter from the sensor;

compare the data to a known characteristic curve, the known characteristic curve indicating potential damage to a component of the electric power steering system; and, when the data matches the known characteristic curve, output an indication that potential damage has occurred to the component of the electric power steering system.

2. The system of claim 1, wherein the sensor is configured to detect a force applied to the steering rack.

3. The system of claim 2, wherein the steering rack includes two dampers attached to either end of the steering rack, and wherein the detected force is a force imparted on at least one of the two dampers.

4. The system of claim 1, wherein the sensor is configured to detect a lateral displacement of the steering rack.

5. The system of claim 4, wherein the electronic controller is further configured to determine a speed gradient of the steering rack based upon the lateral displacement.

6. The system of claim 1, wherein the sensor is configured to detect an angular velocity of the electric motor.

7. The system of claim 6, wherein the electronic controller is further configured to determine a measured angle gradient based upon the angular velocity.

8. The system of claim 1, wherein the comparison of the data to the known characteristic curve includes comparing the data to a threshold.

9. The system of claim 1, wherein the electronic controller is configured to compare data from each of a plurality of sensors of the vehicle in addition to the data from the sensor to a known respective characteristic curve in order to determine if damage has occurred to the steering rack or electric motor.

10. A method for detecting potential damage to an electric power steering system, the system comprising a steering control, a steering shaft connected to the steering control, a steering rack, an electric motor configured to provide an extra torque to the steering rack, a sensor configured to detect an operating parameter of the steering rack or the electric motor, and an electronic controller, the method comprising:

receiving, with the electronic controller, data indicative of the operating parameter from the sensor;

comparing, with the electronic controller, the data to a known characteristic curve, the known characteristic curve indicating potential damage to a component of the electric power steering system; and, when the data matches the known characteristic curve, outputting, with the electronic controller, an indication that potential damage has occurred to the component of the electric power steering system.

11. The method of claim 10, wherein the sensor is configured to detect a force applied to the steering rack.

12. The method of claim 11, wherein the steering rack includes two dampers attached to either end of the steering rack, and wherein the detected force is a force imparted on at least one of the two dampers.

13. The method of claim 10, wherein the sensor is configured to detect a lateral displacement of the steering rack.

14. The method of claim 13, further comprising determining, with the electronic controller, a speed gradient of the steering rack based upon the lateral displacement.

15. The method of claim 10, wherein the sensor is configured to detect an angular velocity of the electric motor.

16. The method of claim 15, further comprising determining, with the electronic controller, a measured angle gradient based upon the angular velocity.

17. The method of claim 10, wherein the comparison of the data to the known characteristic curve includes comparing the data to a threshold.

18. The method of claim 10, further comprising comparing, with the electronic controller, data from each of a plurality of sensors of the vehicle in addition to the data from the sensor to a known respective characteristic curve in order to determine if damage has occurred to the steering rack or electric motor.

* * * * *